United States Patent
Shyam et al.

(10) Patent No.: US 12,508,302 B2
(45) Date of Patent: Dec. 30, 2025

(54) PHARMACEUTICAL COMPOSITION PROVIDING MUCOLYTIC EFFECT

(71) Applicant: FRIMLINE PRIVATE LIMITED, Gujrat (IN)

(72) Inventors: Ankit Shyam, Gujrat (IN); Alpesh Chhunchha, Gujrat (IN)

(73) Assignee: FRIMLINE PRIVATE LIMITED, Gujrat (IN)

( * ) Notice: Subject to any disclaimer, the term of this patent is extended or adjusted under 35 U.S.C. 154(b) by 0 days.

(21) Appl. No.: 18/993,517

(22) PCT Filed: Jul. 18, 2023

(86) PCT No.: PCT/IB2023/057304
§ 371 (c)(1),
(2) Date: Jan. 10, 2025

(87) PCT Pub. No.: WO2024/018374
PCT Pub. Date: Jan. 25, 2024

(65) Prior Publication Data
US 2025/0262283 A1 Aug. 21, 2025

(30) Foreign Application Priority Data
Jul. 20, 2022 (IN) .............. 202221041611

(51) Int. Cl.
*A61K 38/40* (2006.01)
*A61K 31/015* (2006.01)
*A61K 31/05* (2006.01)
*A61K 31/198* (2006.01)
*A61P 11/12* (2006.01)

(52) U.S. Cl.
CPC ............ *A61K 38/40* (2013.01); *A61K 31/015* (2013.01); *A61K 31/05* (2013.01); *A61K 31/198* (2013.01); *A61P 11/12* (2018.01)

(58) Field of Classification Search
CPC ...... A61K 38/40; A61K 31/015; A61K 31/05; A61K 31/198; A61P 11/12
See application file for complete search history.

(56) References Cited

FOREIGN PATENT DOCUMENTS

| | | |
|---|---|---|
| EP | 2070545 A1 | 6/2009 |
| WO | 2021/181276 A1 | 9/2021 |
| WO | 2021/240293 A1 | 12/2021 |

OTHER PUBLICATIONS

Biswas et al, "Pharmacological and Dietary Antioxidant Therapies for Chronic Obstructive Pulmonary Disease," Curr Med Chem 20:1496-1530 (2013) (Year: 2013).*
C.L.A. van Herwaarden et al., "The role of N-acetylcysteine in the treatment of chronic obstructive pulmonary disease", Netherlands Journal of Medicine 47, No. 2: 45-48 (1995).
International Search Report and Written Opinion PCT/IB2023/057304 (Jul. 12, 2023).
International Preliminary Report on Patentability for PCT/IB2023/057304 (Jun. 14, 2024).

* cited by examiner

*Primary Examiner* — Julie Ha
*Assistant Examiner* — Kristina M Hellman
(74) *Attorney, Agent, or Firm* — Merchant & Gould P.C.

(57) ABSTRACT

Pharmaceutical compositions or formulations comprising a synergistic combination of N-acetyl-L-cysteine and lactoferrin are disclosed. The pharmaceutical compositions can comprise a combination of N-acetyl-L-cysteine and lactoferrin in a ratio in a range of 11:1 to 14:1. Various compositions or formulations and processes of preparing the same are provided. The pharmaceutical compositions or formulations provide a mucolytic effect, reduce mucus hypersecretion, and/or reduce oxidative damage in patients with chronic obstructive pulmonary disease (COPD).

9 Claims, 1 Drawing Sheet

PHARMACEUTICAL COMPOSITION PROVIDING MUCOLYTIC EFFECT

This application is a National Stage of PCT/IB2023/057304, filed Jul. 18, 2023, which claims benefit of priority to Indian Patent Application No. 202221041611, filed Jul. 20, 2022, which application is incorporated herein by reference. To the extent appropriate, a claim of priority is made to above disclosed application.

FIELD OF THE INVENTION

The present invention relates to pharmaceutical compositions/formulations providing mucolytic effect. More particularly, the present invention relates to pharmaceutical compositions/formulations comprising a synergistic combination of Lactoferrin and N-Acetyl-L-Cysteine. The present application also provides various compositions/formulations and process of preparing the same. The pharmaceutical compositions/formulations of the present application also help to reduce the oxidative damage in COPD.

BACKGROUND OF THE INVENTION

Chronic Obstructive Pulmonary Disease (COPD) is characterized by a chronic airflow obstruction that is usually progressive and scarcely reversible, caused by a variable association of chronic bronchitis, small airways damage and pulmonary emphysema, consequent to inhalation of noxious particles and gases, especially tobacco smoke, inducing a chronic airway inflammation, and frequently associated with several comorbidities. In addition, COPD is associated with oxidative stress, which results in the inactivation of antiproteinases, airspace epithelial injury, mucus hypersecretion, increased influx of neutrophils into the lungs, transcription factor activation, and gene expression of proinflammatory mediators.

Globally, COPD is among the leading causes of morbidity and mortality. COPD is the third leading cause of death worldwide, causing 3.23 million deaths in 2019. Nearly 90% of COPD deaths in those under 70 years of age occur in low and middle income countries (LMIC). COPD is the seventh leading cause of poor health worldwide (measured by disability-adjusted life years).

Mucus is an adhesive, viscoelastic gel polymer containing inorganic salts, antiseptic enzymes, immunoglobulins and glycoproteins. Mucus is essential for body function and acts as a protective and moisturizing layer to keep critical organs from drying out. The respiratory airways are lined by a layer of protective mucus gel that is located atop the watery periciliary fluid. This layer protects the airway from inhaled irritants and also entraps and clears bacteria, inhibits bacterial growth and biofilm formation.

Mucus hypersecretion is an important phenotype of COPD. It is associated with disease exacerbations, accelerated decline in FEVI and inflammatory cell infiltration. It usually occurs during any alteration in the respiratory system, allergy or infection. During the period of infection, the mucus contains the viruses or bacteria responsible for the infection as well as infection-fighting cells of the body's immune system such as white blood cells. These combinations lead to the formation of phlegm. High amount of phlegm could obstruct the airflow and ultimately will lead to development of respiratory diseases, such as bronchitis, asthma and COPD. Therefore, mucus clearance and sterility maintenance are important in COPD.

In case of prolonged or chronic exposure to toxic agent or irritant, there is continuous neutrophil activation and permanent release of the inflammatory cytokines and proteases leading to permanent mucus hypersecretion. The inflammatory process in COPD involves neutrophils, cytotoxic CD8+ cells and macrophages but the key inflammatory cell in COPD is the neutrophil. The neutrophil releases a variety of enzymes and one of its most important products are neutrophil elastase. Release of inflammatory mediators, such as neutrophil elastase, triggers mucus hypersecretion via activation of various signaling pathways. By releasing neutrophil elastase and tumor necrosis factor (TNF) $\alpha$, neutrophils influence epidermal growth factor receptor (EGFR) expression in airway epithelium, increasing the mucin production. Mucus hypersecretion and gel thickness can be stimulated by macrophage derived and epithelium derived inflammatory mediators such as interleukin 4 (IL-4), IL-5, IL-9, prostaglandin E2, TNF$\alpha$. Therefore, several therapeutic targets for neutrophil-dependent mucus hypersecretion could be studied such as the inhibition of inflammatory cells, their degranulation and release of ROS, and inhibition of signaling pathways (e.g., EGFR, NF$\kappa$B).

To develop an efficient therapy for COPD, N-Acetyl-L-Cysteine (N-Acetylcysteine/NAC) has been tested as a medication that can suppress various pathogenic processes in this disease.

NAC, a precursor of L-cysteine and reduced glutathione, is a thiol compound, which provides sulfhydryl groups. NAC can act as a precursor of reduced glutathione and as a direct reactive oxygen species scavenger, hence regulating the redox status in the cells. In this way NAC can interfere with several signaling pathways that play a role in regulating apoptosis, angiogenesis, cell growth and inflammatory response.

After absorption, NAC is rapidly metabolized to cysteine, which is a direct precursor in the synthesis of intracellular glutathione. Oral NAC has also been tested as a medication that may influence oxidative stress and inflammation in COPD and thus lead to an improvement in lung function and a reduction in the exacerbation and hospitalization rates.

Potentially active agents possessing anti-inflammatory and anti-oxidative properties, as well as mucolytic activity, might be effective in the treatment of COPD. N-Acetyl-L-Cysteine is an effective mucolytic agent that reduces sputum viscosity and elasticity. In addition to mucolytic activity, N-Acetyl-L-Cysteine has been shown to be a potent anti-oxidant and free radical scavenger. N-Acetyl-L-Cysteine, when given orally, has been shown to protect the lungs from the damage of air pollution and cigarette smoking.

Lactoferrin (LF), also known as lactotransferrin (LTF), is a multifunctional protein of the transferrin family. LF is a globular glycoprotein with a molecular mass of about 80 kDa widely represented in various secretory fluids, such as milk, saliva, tears, and nasal secretions. It is also present in the milk of humans and other mammals, in the blood plasma and neutrophils and is one of the major proteins of virtually all exocrine secretions of mammals. LF can be purified from milk or produced recombinantly. Human colostrum ("first milk") has the highest concentration (7 g/L); followed by human milk (1 g/L), then cow milk (150 mg/L). LF is one of the transferrin proteins that transfer iron to the cells and control the level of free iron in the blood and external secretions. LF belongs to the innate immune system and apart from its main biological function, namely binding and transport of iron ions.

Related Prior Arts

WO2021181276A1 relates to a composition for oral use in the treatment of a viral infection of the respiratory system, preferably SARS-coronavirus viral infections (e.g., COVID-19), comprising a mixture M and, optionally, at least one acceptable pharmaceutical grade additive and/or excipient wherein said mixture M consists of Lactoferrin or an acceptable pharmaceutical grade derivative thereof and at least one bacterial strain belonging to the species *Lactobacillus paracasei*. The mixture M further comprises N-acetylcysteine or hyaluronic acid.

U.S. Pat. No. 6,468,965B1 relates to a solid pharmaceutical composition for the oral administration of chelating agents to an individual consisting essentially of: at least 100 milligrams of ethylenediaminetetraacetic acid (EDTA) or a molar equivalent amount of pharmaceutically acceptable salts or hydrated salts of EDTA, at least 75 milligrams of N-acetyl-L-cysteine, at least 10 milligrams of lactoferrin, and an appropriate amount of at least one pharmaceutical formulating agent which is required to put the composition in tablet or capsule form and includes fillers, flow agents, colorants, flavourings, and the like.

WO2021240293A1 relates to a combination of active ingredients consisting of lactoferrin, N-acetylcysteine (NAC), resveratrol, vitamin D, vitamin C, Zinc, Selenium and optionally curcumin.

EP2070545A1 relates to an oral composition containing mint essential oil, *Curcuma longa* derivatives, *Olea europea* derivatives, and possibly one or more of: N-acetylcysteine, glutathione, ubidecarenone, lactoferrin, carotenoids, polyphenols, vitamin C, vitamin E, extract or derivative of St. John's Wort, kava kava, saffron, valerian, passion-flower, camomile and griffonia for the prevention and treatment of inflammatory disorders of the colon.

WO2005014014 relates to a method for inhibiting bacterial colonisation of mucous epithelium in a biological system. The method includes the step of administering to the biological system an effective amount of a mucolytic agent and one or more of colostrum, hyperimmune milk, or a component of colostrum and/or hyperimmune milk that is capable of inhibiting bacterial colonisation in combination with the mucolytic agent.

WO2021181261 relates to a composition for use in a method of treating a viral infection of the respiratory system caused by severe acute respiratory syndrome coronavirus (SARS) comprising a mixture M comprising or, alternatively, consisting of lactoferrin or an acceptable pharmaceutical grade derivative thereof and, optionally, at least one acceptable pharmaceutical grade additive and/or excipient. The mixture M further comprises N-acetylcysteine or hyaluronic acid.

Existing Treatment and Disadvantages

Currently available treatment options contain N-Acetyl-L-Cysteine alone or in combination with other active ingredients. Evidence have proved that a formulation of N-Acetyl-L-Cysteine has its effectiveness in different pathological conditions. However, the formulation containing N-Acetyl-L-Cysteine is still not available which can mitigate the long term mucolysis problems in COPD.

Thus, there is still a need to provide new pharmaceutical compositions/formulations that not only provides better mucolytic effects in the treatment of COPD but are also free of any side effects with good safety profile as compared to the conventional formulations.

It has been found that this may be achieved through the administration of a stable composition/formulation comprising combination of Lactoferrin with N-Acetyl-L-Cysteine.

SUMMARY OF THE INVENTION

It has been found in the present invention that providing mucolytic effect in Chronic Obstructive Pulmonary Disease (COPD) patients (humans or animals) without any side effects accompanied with good tolerability at an effective dose and good safety profile is achieved through the administration of a stable composition/formulation comprising synergistic combination of Lactoferrin (LF) with N-Acetyl-L-Cysteine (NAC).

The present application accordingly provides pharmaceutical compositions/formulations providing mucolytic effect.

In a preferred aspect, the present application provides pharmaceutical compositions/formulations providing mucolytic effect in patients suffering from COPD.

Another aspect of the present invention is to provide pharmaceutical compositions/formulations reducing mucus hypersecretion in patients suffering from COPD.

Another aspect of the present invention is to provide pharmaceutical compositions/formulations reducing the oxidative damage in patients suffering from COPD.

Another aspect of the present invention is to provide suitable treatment for mucus hypersecretion in COPD.

In one aspect, the present invention provides pharmaceutical compositions/formulations comprising a synergistic combination of Lactoferrin and N-Acetyl-L-Cysteine.

In another aspect, the present invention provides pharmaceutical compositions/formulations comprising a synergistic combination of Lactoferrin and N-Acetyl-L-Cysteine for providing mucolytic effect.

In yet another aspect, the present invention provides pharmaceutical compositions/formulations comprising combination of Lactoferrin and N-Acetyl-L-Cysteine in a synergistic ratio.

The Lactoferrin and N-Acetyl-L-Cysteine combination of the present invention is able to provide safe pharmaceutical compositions/formulations with enhanced and/or synergistic effect compared to Lactoferrin and N-Acetyl-L-Cysteine alone for reducing mucus hypersecretion in patients suffering from COPD.

In another aspect, the present invention provides suitable dosage forms comprising a synergistic combination of Lactoferrin and N-Acetyl-L-Cysteine providing mucolytic effect.

In another aspect, the present invention provides pharmaceutical compositions/formulations comprising a synergistic combination of Lactoferrin and N-Acetyl-L-Cysteine along with pharmaceutically acceptable excipients.

Another aspect of the present invention is to provide pharmaceutical compositions/formulations further comprising additional active ingredients.

In yet another aspect, the present invention provides pharmaceutical compositions/formulations comprising Lactoferrin, N-Acetyl-L-Cysteine and additional active ingredients.

Yet another aspect of the present invention is to provide pharmaceutical compositions/formulations comprising a synergistic combination of Lactoferrin, N-Acetyl-L-Cysteine and additional active ingredients.

In yet another aspect, the present invention provides pharmaceutical compositions/formulations comprising Lactoferrin in synergistic combination with N-Acetyl-L-Cysteine and additional active ingredients such as Carotenoids selected from Beta Carotene, Lycopene, Cryptoxanthin or combination thereof providing mucolytic effect.

Yet another aspect of the present invention is to provide pharmaceutical compositions/formulations comprising a synergistic combination of Lactoferrin and N-Acetyl-L-Cysteine with additional active ingredients such as Carotenoids selected from Beta Carotene, Lycopene, Cryptoxanthin along with pharmaceutically acceptable excipients.

In another aspect the present invention provides a suitable dosage form for the compositions/formulations of the present invention. Preferably, the compositions/formulations of the invention are formulated as an oral dosage form.

DETAILED DESCRIPTION OF THE INVENTION

While the invention is susceptible to various modifications and alternative forms, specific embodiments thereof are described in detail in the examples section below. It should be understood, however, that it is not intended to limit the invention to the particular forms disclosed, but on the contrary, the invention is to cover all modifications, equivalents, and alternatives falling within the scope of the invention.

It is further to be understood that all terminology used herein is for the purpose of describing particular embodiments only and is not intended to be limiting in any manner or scope.

Unless defined otherwise, all technical and scientific expressions used herein have the same meaning as commonly understood by one of ordinary skill in the art to which embodiments of the invention pertain.

In describing and claiming the embodiments of the present invention, the following terminology will be used in accordance with the definitions set out below which are known in the state of art.

The singular forms "a" "an" and "the" include plural reference unless the context clearly dictates otherwise.

Unless otherwise specified, all percentages and ratios expressed herein and elsewhere in the specification should be understood to refer to percentages by weight. The amounts given are based on the active weight of the material.

The term 'composition' includes pharmaceutical compositions, nutraceutical compositions, dietary supplement compositions, medicinal compositions, nutritional supplement compositions, food for special medical purpose and any other suitable composition.

The term 'formulation' includes pharmaceutical formulations, nutraceutical formulations, dietary supplement formulations, medicinal formulations, nutritional supplement formulations, food for special medical purpose and any other suitable formulation. The terms composition and formulation are used interchangeably unless the context requires otherwise.

The present invention is directed to pharmaceutical compositions/formulations comprising a synergistic combination of Lactoferrin (LF) and N-Acetyl-L-Cysteine (NAC) providing mucolytic effect, more particularly reducing mucus hypersecretion in Chronic Obstructive Pulmonary Disease (COPD). Also, pharmaceutical compositions/formulations comprising a synergistic combination of Lactoferrin (LF) and N-Acetyl-L-Cysteine (NAC) help to reduce the oxidative damage in COPD.

In this regard, the inventors carried out an extensive research studies along with pre-clinical studies and found that the combination of Lactoferrin and N-Acetyl-L-Cysteine provides a safe composition with enhanced and/or synergistic effect in providing mucolytic effect as compared to Lactoferrin or N-Acetyl-L-Cysteine alone.

The present invention provides pharmaceutical compositions/formulations comprising a synergistic combination of Lactoferrin and N-Acetyl-L-Cysteine providing mucolytic effect in COPD.

In another embodiment, the present invention provides pharmaceutical compositions/formulations comprising a synergistic combination of Lactoferrin and N-Acetyl-L-Cysteine for reducing mucus hypersecretion in COPD.

In yet another embodiment, the pharmaceutical compositions/formulations consists essentially of a synergistic combination of Lactoferrin and N-Acetyl-L-Cysteine.

In another embodiment, the present invention provides pharmaceutical compositions/formulations comprising a combination of Lactoferrin and N-Acetyl-L-Cysteine in an optimized synergistic ratio.

The synergistic combination of the present invention is able to provide safe pharmaceutical compositions/formulations comprising of Lactoferrin and N-Acetyl-L-Cysteine with enhanced and/or synergistic effects providing mucolytic effect in COPD compared to Lactoferrin or N-Acetyl-L-Cysteine alone.

Within the scope of the present invention, it has now been found that the synergistic combination of Lactoferrin with N-Acetyl-L-Cysteine has surprisingly and particularly advantageous effects. This makes them particularly suitable for providing mucolytic effect in COPD.

In another embodiment, the ratio of N-Acetyl-L-Cysteine:Lactoferrin in the pharmaceutical compositions/formulations of the present invention is at least 11:1. In yet another embodiment, the ratio of N-Acetyl-L-Cysteine:Lactoferrin in the pharmaceutical compositions/formulations of the present invention is in a range of 11:1 to 14:1. In yet another embodiment, the ratio of N-Acetyl-L-Cysteine:Lactoferrin in the pharmaceutical compositions/formulations of the present invention is in a range of 12:1 to 14:1. In yet another embodiment, the ratio of N-Acetyl-L-Cysteine:Lactoferrin in the pharmaceutical compositions/formulations is 12:1.

The compositions/formulations of the present invention use Lactoferrin in combination with N-Acetyl-L-Cysteine to provide synergistic effect and enhances the effect of N-Acetyl-L-Cysteine in providing the mucolytic effect in COPD.

In another embodiment, the compositions/formulations of the present invention use N-Acetyl-L-Cysteine in combination with Lactoferrin in a judiciously selected optimized ratio of 11:1 to 14:1 to synergistically provide the mucolytic effect in COPD.

In an embodiment of the present invention, the combination of Lactoferrin and N-Acetyl-L-Cysteine is present in a range of 30% by wt. to 99% by wt. of the composition.

In another embodiment, the pharmaceutical compositions/formulations of the present invention use Lactoferrin in combination with N-Acetyl-L-Cysteine in a synergistic ratio to reduce mucus hypersecretion in COPD.

In another embodiment, the pharmaceutical compositions/formulations of the present invention comprise a synergistic combination of Lactoferrin and N-Acetyl-L-Cysteine with pharmaceutically acceptable excipients.

In yet another embodiment, the pharmaceutical compositions/formulations of the present invention further comprise additional active ingredients such as Carotenoids selected from Beta Carotene, Lycopene, Cryptoxanthin or combination thereof.

The additional active ingredients such as Carotenoids selected from Beta Carotene, Lycopene, Cryptoxanthin or combination thereof may further enhance the effect of synergistic combination of Lactoferrin and N-Acetyl-L-Cysteine.

In an embodiment, the amount of Carotenoid that can be used in the pharmaceutical compositions/formulations of the present invention ranges from 0.15% by wt. to 2.24% by wt. of the compositions/formulations.

In yet another embodiment, the pharmaceutical compositions/formulations of the present invention comprise a synergistic combination of Lactoferrin and N-Acetyl-L-Cysteine with additional active ingredients and pharmaceutically acceptable excipients.

In yet another embodiment, the pharmaceutical compositions/formulations of the present invention comprise a synergistic combination of Lactoferrin and N-Acetyl-L-Cysteine with additional active ingredients such as Carotenoids selected from Beta Carotene, Lycopene, Cryptoxanthin and pharmaceutically acceptable excipients.

In yet another embodiment, the compositions/formulations of the present invention are prepared in any suitable administrable form, such as solid and liquid dosage form. The solid dosage form includes oral dosage form such as powder, tablet, effervescent tablet, capsule, hard capsule filled with liquid or solid, soft capsule, pill, powder, sachet, granule, etc. The liquid dosage form includes oral dosage form such as solution, suspension, emulsion, syrup, etc.

The present invention also relates to a process for preparing the pharmaceutical compositions/formulations of the present invention.

The term "excipient" or "suitable excipient" used herein means a pharmacologically inactive component. The excipients that are useful in preparing pharmaceutical compositions/formulations are generally safe and non-toxic. Reference to an excipient includes both one and more than one such excipient. Co-processed excipients are also covered under the scope of present invention.

In yet another embodiment, the compositions/formulations of the present invention contain pharmaceutically acceptable carriers/vehicles/diluents or excipients to make desired compositions/formulations or dosage form. The "pharmaceutically acceptable carriers/vehicles/diluents or excipients" as used herein is intended to mean, without limitation, any adjuvants, carriers, sweetening agents, flavouring agents (flavour enhancers), diluents, preservative, dye/colorants, surfactants, wetting agents, dispersing agents, suspending agents, complexing agents, stabilizers, isotonic agent, solvent, emulsifier, encapsulating agent, polymers, coating agent, wax, encapsulating polymeric delivery systems. Excipients may also include antiadherents, antioxidants, binders, pH-modifier, solvents, coatings, compression aids, disintegrants, emollients, fillers, film formers, fragrances, glidants (flow enhancers), lubricants, preservatives, sorbents, anticaking agent, food additives, or waters of hydration.

In a preferred embodiment, the pharmaceutically acceptable excipients are selected from Binding agents, Diluents, Disintegrating agents, Glidants, Lubricants, Colourants, Coating agents, Solvents, Effervescent Agents, Flavouring Agents, Sweeteners or combinations thereof.

In an embodiment of the present invention, the Binding agent is present in a range of 1% by wt. to 5% by wt. of the composition. Preferably, Binding agent is selected from a group consisting of Hypromellose, starch, acacia, agar, alginic acid, calcium carbonate, calcium lactate, carbomers, carboxymethylcellulose sodium, carrageenan, cellulose acetate phthalate, ceratonia, chitosan, copovidone, corn starch, pregelatinized starch, cottonseed oil, dextrates, dextrin, dextrose, ethylcellulose, gelatin, glyceryl be-henate, guar gum, hydrogenated vegetable oil type I, hydroxyethyl cellulose, hydroxy-ethylmethyl cellulose, hydroxypropyl cellulose, inulin, lactose, liquid glucose, low-substituted Hypromellose, magnesium aluminum silicate, maltodextrin, maltose, methyl-cellulose, microcrystalline cellulose, pectin, poloxamer, polycarbophil, polydextrose, pol-yethylene oxide, polymethacrylates, povidone, sodium alginate, stearic acid, sucrose, sunflower oil, tricaprylin, vitamin E polyethylene glycol succinate and zein.

In an embodiment of the present invention, the Diluent is present in a range of 2% by wt. to 25% by wt. of the composition. Preferably, the Diluent is selected from a group consisting of microcrystalline cellulose, lactose (anhydrous/monohydrate/spray dried), starch, cellulose powder, silicified microcrystalline cellulose, ammonium alginate, calcium carbonate, calcium lactate, dibasic calcium phosphate (anhydrous/dibasic dehydrate/tribasic), calcium silicate, calcium sulfate, cellulose acetate, compressible sugar, confectioner's sugar, corn starch, pregelatinized starch, dextrates, dextrin, dextrose, erythritol, ethylcellulose, fructose, fumaric acid, glyceryl palmitostearate, isomalt, kaolin, lactitol, magnesium carbonate, magnesium oxide, maltodextrin, maltose, mannitol, medium-chain triglycerides, polydextrose, polymethacrylates, simethicone, sodium alginate, sodium chloride, sorbitol, sterilizable maize, sucrose, sugar spheres, sulfobutylether β-cyclodextrin, talc, tragacanth, trehalose and xylitol.

In an embodiment of the present invention, the Disintegrating agent is present in a range from 2% by wt. to 15% by wt. of the composition. Preferably the Disintegrating agent is selected from a group consisting of croscarmellose sodium, crospovidone, carboxymethyl cellulose (sodium/calcium), sodium starch glycolate, alginic acid, calcium alginate, cellulose powdered, chitosan, colloidal silicon dioxide, corn starch, docusate sodium, glycine, guar gum, hydroxypropyl cellulose low-substituted, magnesium aluminum silicate, methylcellulose, microcrystalline cellulose, polacrilin potassium, povidone, sodium alginate and pregelatinized starch.

In an embodiment of the present invention, the Lubricant is present in a range from 0.1% by wt. to 5% by wt. of the composition. Preferably the Lubricant is selected from a group consisting of magnesium stearate, zinc stearate, calcium stearate, glycerin monostearate, glyceryl behenate, glyceryl palmitostearate, hydrogenated castor oil, hydrogenated vegetable oil type I, light mineral oil, magnesium lauryl sulfate, medium-chain triglycerides, mineral oil, myristic acid, palmitic acid, poloxamer, polyethylene glycol, sodium benzoate, sodium chloride, sodium lauryl sulfate, sodium stearyl fumarate, stearic acid, and talc potassium benzoate.

In an embodiment of the present invention, the Glidant is present in a range from 0.2% by wt. to 2% by wt. of the composition. Preferably, the Glidant is selected from a group consisting of colloidal silicon dioxide, talc, calcium phosphate tribasic, cellulose powdered, hydrophobic colloidal silica, magnesium oxide, magnesium silicate, magnesium trisilicate and silicon dioxide.

In an embodiment of the present invention, the Solvent is selected from a group consisting of water, alcohol, isopropyl alcohol (IPA), methylene chloride (MDC), propylene glycol, almond oil, benzyl alcohol, benzyl benzoate, butylene glycol, carbon dioxide, castor oil, corn oil (maize), cottonseed oil, dibutyl phthalate, diethyl phthalate, dimethyl ether, albumin, dimethyl phthalate, dimethyl sulfoxide, dimethylacetamide, ethyl acetate, ethyl lactate, ethyl oleate, glycerin, glycofurol, isopropyl myristate, isopropyl palmitate, light mineral oil, medium-chain triglycerides, methyl lactate, mineral oil, monoethanolamine, octyldodecanol, olive oil, peanut oil, polyethylene glycol, polyoxyl 35 castor oil, propylene carbonate, pyrrolidone, safflower oil, sesame oil, soybean oil, sunflower oil, triacetin, tricaprylin, triethanolamine, triethyl citrate, triolein and water-miscible solvents.

In an embodiment of the present invention, the Colourant is present in a range from 0.01% to 0.05% by wt. of the composition. Preferably, the Colourant is selected from a group consisting of Curcumin, Riboflavin, Tartrazine, Quinoline yellow, Sunset yellow FCF, Carmine, Carmoisine, Amaranth, Ponceau 4R, Erythrosine, Allura red AC, Patent blue V, Indigo carmine, Brilliant blue FCF, Chlorophylls Copper complexes of chlorophylls and chlorophyllins, Green S, Caramel, Brilliant black BN, Vegetable carbon, Carotenoids, Beetroot red, Anthocyanins, Cyanidin, Delphidin, Malvidin, Pelargonidin, Peonidin, Petunidin, Calcium carbonate, Titanium dioxide, Iron oxides and hydroxides, Brilliant blue FCF, Indigotine, Quinoline yellow WS.

In an embodiment of the present invention, the Effervescent agent is present in a range from 20% by wt to 60% by wt of the composition. Preferably, the Effervescent agent is selected from calcium carbonate, magnesium carbonate, calcium hydrogen carbonate, magnesium hydrogen carbonate, sodium bicarbonate, sodium citrate, potassium citrate, potassium carbonate, sodium carbonate, citric acid, malic acid, fumaric acid, tartaric acid and ascorbic acid.

In an embodiment of the present invention, the Coating agent is present in a range from 1% to 4% by wt. of the composition. Preferably, the Coating agent is selected from a group consisting of film coating agent, seal coating agent and enteric coating agent.

In an embodiment of the present invention, the seal coating agent is selected from a group consisting of Instamoistshield (Hydroxypropyl methyl cellulose, Polyethylene glycol, Talc, Titanium dioxide, Ethyl cellulose), gelatin, copovidone, hydroxyethyl cellulose, ethyl cellulose, starch, vanillin, hydroxypropyl cellulose, guar gum, maleic acid, hypromellose, polymethacrylates and methyl cellulose.

In an embodiment of the present invention, the enteric coating agent is selected from a group consisting of hydroxypropyl methyl cellulose phthalate, polyethylene glycol, titanium dioxide, red Iron oxide, methacrylate copolymer, shellac, sodium alginate, acetyltributyl citrate, carbomers, cellulose acetate phthalate, guar gum, hypromellose acetate succinate, hypromellose phthalate, polymethacrylates, polyvinyl acetate phthalate, potassium chloride, glycerin, sureteric, tributyl citrate, triethyl citrate, triolein, white wax, zein, cellulose acetate phthalate with ethyl cellulose, chitosan, hydroxypropyl cellulose and polymethacrylates.

In an embodiment of the present invention, the film coating agent is selected from instacoat universal (hydroxypropyl methyl cellulose, polyethylene glycol, talc, titanium dioxide), guar gum, hypromellose, povidone, hydroxypropyl cellulose, cellulose acetate, polydextrose, ethyl cellulose, methylcellulose, gelatin, glycerin, maltodextrin, chocolate red iron oxide and starch.

In an embodiment of the present invention, the flavoring agent is present in a range from 1% to 5% by wt. of the composition. Preferably, the flavouring agent is selected from a group consisting of adipic acid, n-butyl lactate, confectioner's sugar, denatonium benzoate, dibutyl sebacate, ethyl acetate, ethyl lactate, ethyl maltol, ethyl vanillin, ethylcellulose, fumaric acid, leucine, malic acid, maltol, menthol, methionine, monosodium glutamate, phosphoric acid, propionic acid, sodium acetate, sodium lactate, sodium propionate, tartaric acid, thymol, triethyl citrate, vanillin, Vanilla, Pineapple, Mixed fruit, Banana and Orange.

In an embodiment of the present invention, the sweetening agent is present in a range from 0.1% to 0.5% by wt. of the composition. Preferably, the sweetening agent is selected from a group consisting of Lactitol (anhydrous), maltitol, mannitol, sorbitol, sucrose, xylitol, acesulfame potassium, alitame, aspartame, compressible sugar, confectioner's sugar, dextrose, erythritol, fructose, glycerin, glycine, isomalt, lactitol, liquid glucose, maltitol, maltitol solution, maltose, neohesperidin dihydrochalcone, neotame, saccharin, saccharin sodium, sodium cyclamate, sucralose, tagatose, thaumatin and trehalose.

In an embodiment of the present invention, the solubilizing agent is selected from a group consisting of polysorbate 80, sodium lauryl sulfate, anionic emulsifying wax, glycerol, nonionic emulsifying wax, glyceryl monooleate, phospholipids, polyoxyethylene alkyl ethers, polyoxyethylene castor oil derivatives, polyoxyethylene sorbitan fatty acid esters, polyoxyethylene stearates, polyoxylglycerides, sorbitan esters, triethyl citrate, vitamin E polyethylene glycol succinate, microcrystalline cellulose, carboxymethylcellulose sodium, diethanolamine, ethylene glycol palmitostearate, glycerin monostearate, hypromellose, hypromellose acetate succinate, lecithin, polyethylene alkyl ethers, aluminum oxide, poly(methylvinyl ether/maleic anhydride), calcium carbonate, crospovidone, cyclodextrins, fructose, hydroxypropyl betadex, oleyl alcohol, povidone, benzalkonium chloride, benzethonium chloride, benzyl alcohol, benzyl benzoate, cetylpyridinium chloride, inulin, meglumine, poloxamer, pyrrolidone, sodium bicarbonate, starch, stearic acid, sulfobutylether β-cyclodextrin, tricaprylin, triolein, docusate sodium, glycine, alcohol, self-emulsifying glyceryl monooleate, cationic benzethonium chloride, cetrimide, xanthan gum, lauric acid, myristyl alcohol, butylparaben, ethylparaben, methylparaben, propylparaben and sorbic acid.

In an embodiment of the present invention, the antioxidant is selected from a group consisting of propyl gallate, lecithin, vitamin E, tocopherol, sesamin, sesamol, sesamolin, alpha tocopherol, ascorbic acid, ascorbyl palmitate, fumaric acid, malic acid, sodium metabisulphite, butylated hydroxyanisole and butylated hydroxytoluene (BHT).

In an embodiment of the present invention, the preservative is selected from a group consisting of diazolidinyl urea, iodopropnyl butylcarbamate, vitamin E (alpha-tocopherol) and its derivatives including vitamin E acetate (alpha-tocopherol acetate), vitamin C (ascorbic acid), butylated hydroxytoluene (BHT) butylated hydroxyanisole (BHA), esters of p-hydroxy benzoic acid, ethylparaben, propylparaben and butylparaben.

In an embodiment, the pharmaceutical compositions/formulations of the present invention comprises of a synergistic combination of Lactoferrin, N-Acetyl-L-Cysteine and pharmaceutically acceptable excipients.

In yet another embodiment, the pharmaceutical compositions/formulations of the present invention comprises of a synergistic combination of Lactoferrin, N-Acetyl-L-Cysteine, additional active ingredients and pharmaceutically acceptable excipients.

The present invention also provides for suitable treatment of COPD. In a preferred feature, the present invention provides for suitable treatment providing mucolytic effect, especially reducing mucus hypersecretion in COPD, by providing effective amount of the pharmaceutical compositions/formulations of the present invention.

In an embodiment of the present invention, the composition is for providing mucolytic effect in COPD or for reducing mucus hypersecretion in COPD.

The following methods and excipients are merely exemplary and are in no way limiting. In pharmaceutical dosage forms, Optional ingredient(s) employed in the present invention may be used alone or in appropriate association, as well as in combination with other pharmaceutically active compounds.

Some of the exemplary compositions/formulations of the present invention are described below:

| Composition/Formulation 1 | | |
|---|---|---|
| Sr. No. | Ingredients | Ratio/% w/w |
| 1 | N-Acetyl-L-Cysteine | 11:1 to 14:1 |
| 2 | Lactoferrin | |

| Composition/Formulation 2 | | |
|---|---|---|
| Sr. No. | Ingredients | Ratio/% w/w |
| 1 | N-Acetyl-L-Cysteine | 11:1 to 14:1 |
| 2 | Lactoferrin | |
| 3 | Carotenoids | 0.15% to 2.24% |

General Process of Preparation of the Composition/Formulation of the Present Invention:

Manufacturing Procedure: (Film Coated Tablets)
1. Weigh accurately all the ingredients in separate containers.
2. Pass previously weighed ingredients (such as Active Ingredients, diluent, disintegrants lubricants, and glidants) separately through sieve sieve #30.
3. Mix content of step 2, i.e., sifted ingredients (Dry mix ingredients) with slow speed in RMG for about 15 min.
4. Prepare a dough/wet mass by adding a binder solution to the mixed ingredients of step 3.
5. Dry the wet granules/wet mass obtained in step 4 till the required LOD (loss on drying) is reached.
6. Sieve the dried granules obtained in step 5 through a suitable sieve (preferably sieve #30).
7. Add previously sifted ingredients (Lubrication part ingredients) to the dried granules obtained in step 6 and blend for about 10 minutes in blender.
8. Compress the blend with suitable punch.

Preparation of Film Coating Solution:
9. Take weighed quantity of Solvent (such as Isopropyl alcohol) in mixing vessel.
10. Using Mechanical Stirrer, stir the Solvent to form a vortex.
11. Add required quantity of Film coating agent to centre of the solvent vortex in a slow steady stream, avoiding clumping and maintain a vortex stir for about 5 minutes, then add quantity of Solvent (such as methylene dichloride).
12. Once entire qty. of Film coating agent has been added, reduce the stirrer speed to eliminate the vortex. Continue mixing for about 45 minutes.
13. Filter the solution through #100 nylon cloth and collect the material in a S.S Vessel.
14. Transfer tablets to coating pan & connect the peristaltic pump into coating solution vessel. Maintain the temperature and humidity of coating area at 25±2° C. and 50±5%.
15. Perform coating process.
16. When the coating is completed, store the tablets in double polyethylene lined container, and seal the polyethylene bags properly.

Manufacturing Procedure: (Effervescent Tablets)
(Temperature of NMT 20° C. and Humidity Condition of 20% RH is Maintained at all Stages of Manufacturing.)
1. Weigh accurately all the ingredients in separate containers.
2. Pass previously weighed ingredients (Such as Active Ingredients, diluent, effervescent agent, binder, lubricant, sweetener, flavour) separately through sieve #30.
3. Mix content of step 2 ingredients (Dry mix ingredients) in RMG with slow speed for about 15 minutes.
4. Prepare a dough/wet mass by adding a binder solution to the mixed ingredients of step 3.
5. Dry the wet granules/wet mass obtained in step 4 till the required LOD (loss on drying) is reached.
6. Sieve the dried granules obtained in step 5 through a suitable sieve.
7. Add sifted (lubrication part ingredients) to the dried granules obtained in step 6 and blend for about 10 minutes in blender.
8. Compress the blend with suitable punch.

Manufacturing Procedure: (Capsule Dosage Form)
1. Weigh accurately all the ingredients in separate containers.
2. Pass previously weighed ingredients separately through sieve #30.
3. Mix content of step 2 in a Blender with slow speed.
4. Pass previously weighed lubricant through sieve #40. Transfer it to blender & run blender.
5. Fill and seal the blend obtained in step 4 with HPMC capsule shells.
6. Transfer the filled capsules into the hopper of polishing and visual inspection machine to remove the debris of powder sticking with the capsule shells.
7. Temperature of NMT 25° C. and humidity condition of 50% RH is maintained at all stages of manufacturing.

EXAMPLES

The following examples are set forth to illustrate the compositions/formulations of the present invention. The examples also provide and/or demonstrate efficacy or synergistic effect of the pharmaceutical compositions/formulations of the present invention. These examples are not intended to be inclusive of all aspects of the subject matter disclosed herein, but rather to illustrate representative methods, compositions, and results. These examples are not intended to exclude equivalents and variations of the present invention, which are apparent to one skilled in the art.

Example 1—Coated Tablet

| Sr. No. | Ingredients | Ratio/% w/w |
|---|---|---|
| 1 | N-Acetyl-L-Cysteine | 11:1 |
| 2 | Lactoferrin | (71.43%) |
| 3 | Klucel LFX (HPC) | 1.96% |
| 4 | Croscarmallose sodium | 2.38% |
| 5 | Isopropyl Alcohol (IPA) | Q.s. |
| 6 | Microcrystalline cellulose (pH 102) | 14.10% |
| 7 | Croscarmallose sodium | 5.95% |
| 8 | Aerosil | 1.07% |
| 9 | Magnesium Stearate | 0.71% |
| 10 | Colour - Red Iron Oxide | 0.02% |
| 11 | Instacoat Flavour - Chocolate Red Iron Oxide (A47D00634) | 2.38% |
| 12 | IPA | Q.s. |
| 13 | Methylene Chloride (MDC). | Q.s. |

Example 2—Coated Tablet

| Sr. No. | Ingredients | Ratio/% w/w |
|---|---|---|
| 1 | N-Acetyl-L-Cysteine | 12:1 |
| 2 | Lactoferrin | (73.04%) |
| 3 | Klucel LFX (HPC) | 2.02% |
| 4 | Croscarmallose sodium | 2.25% |
| 5 | IPA | Q.s. |
| 6 | Microcrystalline cellulose (pH 102) | 13.12% |
| 7 | Croscarmallose sodium | 5.62% |
| 8 | Aerosil | 1.01% |
| 9 | Magnesium Stearate | 0.67% |
| 10 | Colour - Red Iron Oxide | 0.02% |
| 11 | Instacoat Flavour - Chocolate Red Iron Oxide (A47D00634) | 2.25% |
| 12 | IPA | Q.s. |
| 13 | MDC | Q.s. |

Example 3—Coated Tablet

| Sr. No. | Ingredients | Ratio/% w/w |
|---|---|---|
| 1 | N-Acetyl-L-Cysteine | 14:1 |
| 2 | Lactoferrin | (75.38%) |
| 3 | Klucel LFX (HPC) | 2.11% |
| 4 | Croscarmallose sodium | 2.11% |
| 5 | IPA | Q.s. |
| 6 | Microcrystalline cellulose (pH 102) | 11.24% |
| 7 | Croscarmallose sodium | 5.03% |
| 8 | Aerosil | 0.9% |
| 9 | Magnesium Stearate | 0.7% |
| 10 | Colour - Red Iron Oxide | 0.02% |
| 11 | Instacoat Flavour - Chocolate Red Iron Oxide (A47D00634) | 2.51% |
| 12 | IPA | Q.s. |
| 13 | MDC | Q.s. |

Example 4—Effervescent Tablet

| Sr. No. | Ingredients | Ratio/% w/w |
|---|---|---|
| 1 | N-Acetyl-L-Cysteine | 12:1 |
| 2 | Lactoferrin | (31.56%) |
| 3 | Citric acid | 29.13% |
| 4 | PVP K 30 | 1.21% |
| 5 | IPA | Q.s. |
| 6 | Mannitol | 2.43% |
| 7 | Sodium bicarbonate | 29.12% |
| 8 | Flavor (Orange) | 2.43% |
| 9 | Sucralose | 0.24% |
| 10 | Polyethylene glycol | 1.94% |
| 11 | Sodium benzoate | 1.94% |

Example 5—Capsule

| Sr. No. | Ingredients | Ratio/% w/w |
|---|---|---|
| 1 | N-Acetyl-L-Cysteine | 12:1 |
| 2 | Lactoferrin | (98.93%) |
| 3 | Magnesium Stearate | 1.07% |

Example 6—Coated Tablet

| Sr. No. | Ingredients | Ratio/% w/w |
|---|---|---|
| 1 | N-Acetyl-L-Cysteine | 12:1 |
| 2 | Lactoferrin | (65.99%) |
| 3 | Lycopene | 0.31% |
| 4 | Klucel LFX (HPC) | 2.74% |
| 5 | Croscarmallose sodium | 4.57% |
| 6 | IPA | Q.s. |
| 7 | Microcrystalline cellulose (pH 102) | 14.80% |
| 8 | Croscarmallose sodium | 7.11% |
| 9 | Aerosil | 1.52% |
| 10 | Magnesium Stearate | 0.91% |
| 11 | Colour - Red Iron Oxide | 0.02% |
| 12 | Instacoat Flavour - Chocolate Red Iron Oxide (A47D00634) | 2.03% |
| 13 | IPA | Q.s. |
| 14 | MDC | Q.s. |

Example 7—Coated Tablet

| Sr. No. | Ingredients | Ratio/% w/w |
|---|---|---|
| 1 | N-Acetyl-L-Cysteine | 12:1 |
| 2 | Lactoferrin | (85.53%) |
| 3 | Lycopene | 1.32% |
| 4 | Klucel LFX (HPC) | 1.05% |
| 5 | Croscarmallose sodium | 1.71% |
| 6 | IPA | Q.s. |
| 7 | Microcrystalline cellulose (pH 102) | 6.68% |
| 8 | Croscarmallose sodium | 1.71% |
| 9 | Aerosil | 0.39% |
| 10 | Magnesium Stearate | 0.26% |
| 11 | Colour - Red Iron Oxide | 0.03% |
| 12 | Instacoat Flavour - Chocolate Red Iron Oxide (A47D00634) | 1.32% |
| 13 | IPA | Q.s. |
| 14 | MDC | Q.s. |

Example 8—Coated Tablet

| Sr. No. | Ingredients | Ratio/% w/w |
|---|---|---|
| 1 | N-Acetyl-L-Cysteine | 12:1 |
| 2 | Lactoferrin | (73.04%) |
| 3 | Cryptoxanthain | 0.56% |
| 4 | Klucel LFX (HPC) | 2.02% |
| 5 | Croscarmallose sodium | 2.25% |
| 6 | IPA | Q.s. |
| 7 | Microcrystalline cellulose (pH 102) | 12.56% |
| 8 | Croscarmallose sodium | 5.62% |
| 9 | Aerosil | 1.01% |
| 10 | Magnesium Stearate | 0.67% |
| 11 | Colour - Red Iron Oxide | 0.02% |
| 12 | Instacoat Flavour - Chocolate Red Iron Oxide (A47D00634) | 2.25% |
| 13 | IPA | Q.s. |
| 14 | MDC | Q.s. |

Example 9—Coated Tablet

| Sr. No. | Ingredients | Ratio/% w/w |
|---|---|---|
| 1 | N-Acetyl-L-Cysteine | 12:1 |
| 2 | Lactoferrin | (73.04%) |
| 3 | Beta Carotene | 1.12% |
| 4 | Cryptoxanthain | 0.56% |
| 5 | Klucel LFX (HPC) | 2.02% |
| 6 | Croscarmallose sodium | 2.25% |
| 7 | IPA | Q.s. |
| 8 | Microcrystalline cellulose (pH 102) | 11.44% |
| 9 | Croscarmallose sodium | 5.62% |
| 10 | Aerosil | 1.01% |
| 11 | Magnesium Stearate | 0.67% |
| 12 | Colour - Red Iron Oxide | 0.02% |
| 13 | Instacoat Flavour - Chocolate Red Iron Oxide (A47D00634) | 2.25% |
| 14 | IPA | Q.s. |
| 15 | MDC | Q.s. |

Example 10—Coated Tablet

| Sr. No. | Ingredients | Ratio/% w/w |
|---|---|---|
| 1 | N-Acetyl-L-Cysteine | 10:1 |
| 2 | Lactoferrin | (74.16%) |
| 3 | Klucel LFX (HPC) | 2.02% |
| 4 | Croscarmallose sodium | 2.25% |
| 5 | IPA | Q.s. |
| 6 | Microcrystalline cellulose (pH 102) | 12.00% |
| 7 | Croscarmallose sodium | 5.62% |
| 8 | Aerosil | 1.01% |
| 9 | Magnesium Stearate | 0.67% |
| 10 | Colour - Red Iron Oxide | 0.02% |
| 11 | Instacoat Flavour - Chocolate Red Iron Oxide (A47D00634) | 2.25% |
| 12 | IPA | Q.s. |
| 13 | MDC | Q.s. |

Example 11—Coated Tablet

| Sr. No. | Ingredients | Ratio/% w/w |
|---|---|---|
| 1 | N-Acetyl-L-Cysteine | 11:1 |
| 2 | Lactoferrin | (73.54%) |
| 3 | Klucel LFX (HPC) | 2.02% |
| 4 | Croscarmallose sodium | 2.25% |
| 5 | IPA | Q.s. |
| 6 | Microcrystalline cellulose (pH 102) | 12.62% |
| 7 | Croscarmallose sodium | 5.62% |
| 8 | Aerosil | 1.01% |
| 9 | Magnesium Stearate | 0.67% |
| 10 | Colour - Red Iron Oxide | 0.02% |
| 11 | Instacoat Flavour - Chocolate Red Iron Oxide (A47D00634) | 2.25% |
| 12 | IPA | Q.s. |
| 13 | MDC | Q.s. |

Example 12—Coated Tablet

| Sr. No. | Ingredients | Ratio/% w/w |
|---|---|---|
| 1 | N-Acetyl-L-Cysteine | 13:1 |
| 2 | Lactoferrin | (72.58%) |
| 3 | Klucel LFX (HPC) | 2.02% |
| 4 | Croscarmallose sodium | 2.25% |
| 5 | IPA | Q.s. |
| 6 | Microcrystalline cellulose (pH 102) | 13.57% |
| 7 | Croscarmallose sodium | 5.62% |
| 8 | Aerosil | 1.01% |
| 9 | Magnesium Stearate | 0.67% |
| 10 | Colour - Red Iron Oxide | 0.02% |
| 11 | Instacoat Flavour - Chocolate Red Iron Oxide (A47D00634) | 2.25% |
| 12 | IPA | Q.s. |
| 13 | MDC | Q.s. |

Example 13—Coated Tablet

| Sr. No. | Ingredients | Ratio/% w/w |
|---|---|---|
| 1 | N-Acetyl-L-Cysteine | 14:1 |
| 2 | Lactoferrin | (72.22%) |
| 3 | Klucel LFX (HPC) | 2.02% |
| 4 | Croscarmallose sodium | 2.25% |
| 5 | IPA | Q.s. |
| 6 | Microcrystalline cellulose (pH 102) | 13.93% |
| 7 | Croscarmallose sodium | 5.62% |
| 8 | Aerosil | 1.01% |
| 9 | Magnesium Stearate | 0.67% |
| 10 | Colour - Red Iron Oxide | 0.02% |
| 11 | Instacoat Flavour - Chocolate Red Iron Oxide (A47D00634) | 2.25% |
| 12 | IPA | Q.s. |
| 13 | MDC | Q.s. |

Example 14—Coated Tablet

| Sr. No. | Ingredients | Ratio/% w/w |
|---|---|---|
| 1 | N-Acetyl-L-Cysteine | 15:1 |
| 2 | Lactoferrin | (71.91%) |
| 3 | Klucel LFX (HPC) | 2.02% |
| 4 | Croscarmallose sodium | 2.25% |

-continued

| Sr. No. | Ingredients | Ratio/% w/w |
|---|---|---|
| 5 | IPA | Q.s. |
| 6 | Microcrystalline cellulose (pH 102) | 14.25% |
| 7 | Croscarmallose sodium | 5.62% |
| 8 | Aerosil | 1.01% |
| 9 | Magnesium Stearate | 0.67% |
| 10 | Colour - Red Iron Oxide | 0.02% |
| 11 | Instacoat Flavour - Chocolate Red Iron Oxide (A47D00634) | 2.25% |
| 12 | IPA | Q.s. |
| 13 | MDC | Q.s. |

Example 15—Effervescent Tablet

| Sr. No. | Ingredients | Ratio/% w/w |
|---|---|---|
| 1 | N-Acetyl-L-Cysteine | 12:1 |
| 2 | Lactoferrin | (31.55%) |
| 3 | Cryptoxanthin | 0.15% |
| 4 | Citric acid | 29.13% |
| 5 | PVP K 30 | 1.21% |
| 6 | IPA | Q.s. |
| 7 | Mannitol | 2.28% |
| 8 | Sodium bicarbonate | 29.13% |
| 9 | Flavour (Orange) | 2.43% |
| 10 | Sucralose | 0.24% |
| 11 | Polyethylene glycol | 1.94% |
| 12 | Sodium benzoate | 1.94% |

Example 16—Effervescent Tablet

| Sr. No. | Ingredients | Ratio/% w/w |
|---|---|---|
| 1 | N-Acetyl-L-Cysteine | 12:1 |
| 2 | Lactoferrin | (31.55%) |
| 3 | Beta carotene | 0.49% |
| 4 | Citric acid | 29.13% |
| 5 | PVP K 30 | 1.21% |
| 6 | IPA | Q.s. |
| 7 | Mannitol | 1.94% |
| 8 | Sodium bicarbonate | 29.13% |
| 9 | Flavour (Orange) | 2.43% |
| 10 | Sucralose | 0.24% |
| 11 | Polyethylene glycol | 1.94% |
| 12 | Sodium benzoate | 1.94% |

Example 17—Effervescent Tablet

| Sr. No. | Ingredients | Ratio/% w/w |
|---|---|---|
| 1 | N-Acetyl-L-Cysteine | 12:1 |
| 2 | Lactoferrin | (31.55%) |
| 3 | Lycopene | 0.24% |
| 4 | Citric acid | 29.13% |
| 5 | PVP K 30 | 1.21% |
| 6 | IPA | Q.s. |
| 7 | Mannitol | 2.18% |
| 8 | Sodium bicarbonate | 29.13% |
| 9 | Flavour (Orange) | 2.43% |
| 10 | Sucralose | 0.24% |
| 11 | Polyethylene glycol | 1.94% |
| 12 | Sodium benzoate | 1.94% |

Example 18—Effervescent Tablet

| Sr. No. | Ingredients | Ratio/% w/w |
|---|---|---|
| 1 | N-Acetyl-L-Cysteine | 12:1 |
| 2 | Lactoferrin | (31.55%) |
| 3 | Beta carotene | 0.49% |
| 4 | Lycopene | 0.24% |
| 5 | Citric acid | 29.13% |
| 6 | PVP K 30 | 1.21% |
| 7 | IPA | Q.s. |
| 8 | Mannitol | 1.70% |
| 9 | Sodium bicarbonate | 29.13% |
| 10 | Flavour (Orange) | 2.43% |
| 11 | Sucralose | 0.24% |
| 12 | Polyethylene glycol | 1.94% |
| 13 | Sodium benzoate | 1.94% |

Example 19—Capsule

| Sr. No. | Ingredients | Ratio/% w/w |
|---|---|---|
| 1 | N-Acetyl-L-Cysteine | 12:1 |
| 2 | Lactoferrin | (98.93%) |
| 3 | Cryptoxanthin | 0.46% |
| 4 | Magnesium stearate | 0.61% |

Example 20—Capsule

| Sr. No. | Ingredients | Ratio/% w/w |
|---|---|---|
| 1 | N-Acetyl-L-Cysteine | 12:1 |
| 2 | Lactoferrin | (97.89%) |
| 3 | Beta carotene | 1.51% |
| 4 | Magnesium stearate | 0.60% |

Example 21—Capsule

| Sr. No. | Ingredients | Ratio/% w/w |
|---|---|---|
| 1 | N-Acetyl-L-Cysteine | 12:1 |
| 2 | Lactoferrin | (98.63%) |
| 3 | Lycopene | 0.76% |
| 4 | Magnesium stearate | 0.61% |

Example 22—Capsule

| Sr. No. | Ingredients | Ratio/% w/w |
|---|---|---|
| 1 | N-Acetyl-L-Cysteine | 12:1 |
| 2 | Lactoferrin | (97.16%) |
| 3 | Beta carotene | 1.49% |
| 4 | Lycopene | 0.75% |
| 5 | Magnesium stearate | 0.60% |

Example 23—Coated Tablet

| Sr. No. | Ingredients | Ratio/% w/w |
|---|---|---|
| 1 | N-Acetyl-L-Cysteine | 12:1 |
| 2 | Lactoferrin | (72.22%) |
| 3 | Beta Carotene | 1.11% |
| 4 | Klucel LFX (HPC) | 2.22% |
| 5 | Croscarmallose sodium | 2.67% |
| 6 | IPA | Q.s. |
| 7 | Microcrystalline cellulose (pH 102) | 12.31% |
| 8 | Croscarmallose sodium | 5.56% |
| 9 | Aerosil | 1.00% |
| 10 | Magnesium Stearate | 0.67% |
| 11 | Colour - Red Iron Oxide | 0.02% |
| 12 | Instacoat Flavour - Chocolate Red Iron Oxide (A47D00634) | 2.22% |
| 13 | IPA | Q.s. |
| 14 | MDC | Q.s. |

Example 24: Stability Data of Example 2 at 40° C., 75% RH (Relative Humidity)

| Sr. No | TEST | Specification | Duration of Study | | | |
|---|---|---|---|---|---|---|
| | | | Initial | 1 Months | 3 Months | 6 Months |
| 1.0 | Description | Brick red coloured, elongated, biconvex film coated tablets plain on both sides. | Complies | Complies | Complies | Complies |
| 2.0 | Disintegration Test | Not more than 30 minutes | 11 minutes | 10-11 minutes | 11-12 minutes | 9-11 minutes |
| 3.0 | | Assay | | | | |
| 3.1 | N-Acetyl-L-Cysteine | 90.0% to 110.0% of labelled amount | 101.2% | 100.2% | 101.4% | 99.2% |
| 3.2 | Lactoferrin | 90.0% to 110.0% of labelled amount | 99.8% | 100.6% | 98.8% | 99.8% |

Example 25: Stability Data & Dissolution Data of Example 4 at 40° C., 75% RH

| Sr. No | TEST | Specification | Duration of Study | | | |
|---|---|---|---|---|---|---|
| | | | Initial | 1 Months | 3 Months | 6 Months |
| 1.0 | Description | White to off white round tablets plain on both sides | Complies | Complies | Complies | Complies |
| 2.0 | Disintegration Test | Not more than 5 minutes | 2 to 4 minutes | 3 to 4 minutes | 3 to 4 minutes | 3 to 4 minutes |
| 3.0 | | Assay | | | | |
| 3.1 | N-Acetyl-L-Cysteine | 90.0% to 110.0% of labelled amount | 98.9% | 97.6% | 96.7% | 98.2% |
| 3.2 | Lactoferrin | 90.0% to 110.0% of labelled amount | 99.4% | 97.5% | 97.8% | 98.1% |

Example 26: Stability Data of Example 5 at 40° C., 75% RH

| Sr. No | TEST | Specification | Duration of Study | | | |
|---|---|---|---|---|---|---|
| | | | Initial | 1 Months | 3 Months | 6 Months |
| 1.0 | Description | White to off white granular powder filled in size 00 capsules having red cap and red body. | Complies | Complies | Complies | Complies |
| 2.0 | Disintegration Test | Not more than 30 minutes | 7 to 8 minutes | 8-11 minutes | 9-11 minutes | 7-9 minutes |
| 3.0 | Assay | | | | | |
| 3.1 | N-Acetyl-L-Cysteine | 90.0% to 110.0% of labelled amount | 101.9% | 100.9% | 99.6% | 99.4% |
| 3.2 | Lactoferrin | 90.0% to 110.0% of labelled amount | 102.5% | 100.6% | 99.8% | 98.9% |

Example 27: Stability Data of Example 6 at 40° C., 75% RH

| Sr. No | TEST | Specification | Duration of Study | | | |
|---|---|---|---|---|---|---|
| | | | Initial | 1 Months | 3 Months | 6 Months |
| 1.0 | Description | Brick red coloured, elongated, biconvex film coated tablets plain on both sides. | Complies | Complies | Complies | Complies |
| 2.0 | Disintegration Test | Not more than 30 minutes | 10-11 minutes | 9-11 minutes | 10-12 minutes | 10-13 minutes |
| 3.0 | Assay | | | | | |
| 3.1 | N-Acetyl-L-Cysteine | 90.0% to 110.0% of labelled amount | 101.6% | 99.7% | 101.4% | 99.2% |
| 3.2 | Lactoferrin | 90.0% to 110.0% of labelled amount | 102.4% | 101.9% | 100.6% | 99.8% |
| 3.3 | Lycopene | 90.0% to 110.0% of labelled amount | 98.6% | 97.3% | 100.2% | 98.7% |

Example 28: Stability Data of Example 7 at 40° C., 75% RH

| Sr. No | TEST | Specification | Duration of Study | | | |
|---|---|---|---|---|---|---|
| | | | Initial | 1 Months | 3 Months | 6 Months |
| 1.0 | Description | Brick red coloured, elongated, biconvex film coated tablets plain on both sides. | Complies | Complies | Complies | Complies |
| 2.0 | Disintegration Test | Not more than 30 minutes | 9-11 minutes | 10-13 minutes | 10-12 minutes | 9-13 minutes |
| 3.0 | Assay | | | | | |
| 3.1 | N-Acetyl-L-Cysteine | 90.0% to 110.0% of labelled amount | 98.6% | 99.2% | 100.4% | 96.5% |
| 3.2 | Lactoferrin | 90.0% to 110.0% of labelled amount | 101.2% | 99.9% | 98.3% | 96.9% |
| 3.3 | Lycopene | 90.0% to 110.0% of labelled amount | 97.6% | 98.3% | 100.4% | 96.8% |

Example 29: Stability Data of Example 8 at 40° C., 75% RH

| Sr. No | TEST | Specification | Duration of Study | | | |
|---|---|---|---|---|---|---|
| | | | Initial | 1 Months | 3 Months | 6 Months |
| 1.0 | Description | Brick red coloured, elongated, biconvex film coated tablets plain on both sides. | Complies | Complies | Complies | Complies |
| 2.0 | Disintegration Test | Not more than 30 minutes | 11-13 minutes | 10-14 minutes | 9-13 minutes | 12-14 minutes |
| 3.0 | | Assay | | | | |
| 3.1 | N-Acetyl-L-Cysteine | 90.0% to 110.0% of labelled amount | 101.2% | 99.3% | 100.2% | 97.5% |
| 3.2 | Lactoferrin | 90.0% to 110.0% of labelled amount | 97.7% | 99.6% | 98.1% | 96.4% |
| 3.3 | Cryptoxanthin | 90.0% to 110.0% of labelled amount | 97.8% | 98.9% | 95.9% | 96.4% |

Example 30: Stability Data of Example 11 at 40° C., 75% RH

| Sr. No | TEST | Specification | Duration of Study | | | |
|---|---|---|---|---|---|---|
| | | | Initial | 1 Months | 3 Months | 6 Months |
| 1.0 | Description | Brick red coloured, elongated, biconvex film coated tablets plain on both sides. | Complies | Complies | Complies | Complies |
| 2.0 | Disintegration Test | Not more than 30 minutes | 8-10 minutes | 9-12 minutes | 10-13 minutes | 10-12 minutes |
| 3.0 | | Assay | | | | |
| 3.1 | N-Acetyl-L-Cysteine | 90.0% to 110.0% of labelled amount | 98.1% | 98.3% | 97.20% | 98.5% |
| 3.2 | Lactoferrin | 90.0% to 110.0% of labelled amount | 98.2% | 97.1% | 97.4% | 96.4% |

Example 31: Stability Data of Example 12 at 40° C., 75% RH

| Sr. No | TEST | Specification | Duration of Study | | | |
|---|---|---|---|---|---|---|
| | | | Initial | 1 Months | 3 Months | 6 Months |
| 1.0 | Description | Brick red coloured, elongated, biconvex film coated tablets plain on both sides. | Complies | Complies | Complies | Complies |
| 2.0 | Disintegration Test | Not more than 30 minutes | 8-9 minutes | 9-11 minutes | 9-12 minutes | 8-10 minutes |
| 3.0 | | Assay | | | | |
| 3.1 | N-Acetyl-L-Cysteine | 90.0% to 110.0% of labelled amount | 99.2% | 100.3% | 97.90% | 98.9% |
| 3.2 | Lactoferrin | 90.0% to 110.0% of labelled amount | 97.2% | 99.1% | 96.6% | 97.3% |

Example 32: Stability Data of Example 13 at 40° C., 75% RH

| Sr. No | TEST | Specification | Duration of Study | | | |
|---|---|---|---|---|---|---|
| | | | Initial | 1 Months | 3 Months | 6 Months |
| 1.0 | Description | Brick red coloured, elongated, biconvex film coated tablets plain on both sides. | Complies | Complies | Complies | Complies |
| 2.0 | Disintegration Test | Not more than 30 minutes | 10-11 minutes | 9-11 minutes | 9-12 minutes | 10-12 minutes |
| 3.0 | | Assay | | | | |
| 3.1 | N-Acetyl-L-Cysteine | 90.0% to 110.0% of labelled amount | 98.6% | 100.5% | 96.9% | 98.3% |
| 3.2 | Lactoferrin | 90.0% to 110.0% of labelled amount | 97.5% | 98.2% | 95.7% | 97.7% |

Example 33: Stability Data of Example 23 at 40° C., 75% RH

| Sr. No | TEST | Specification | Duration of Study | | | |
|---|---|---|---|---|---|---|
| | | | Initial | 1 Months | 3 Months | 6 Months |
| 1.0 | Description | Brick red coloured, elongated, biconvex film coated tablets plain on both sides. | Complies | Complies | Complies | Complies |
| 2.0 | Disintegration Test | Not more than 30 minutes | 9-11 minutes | 10-13 minutes | 10-12 minutes | 9-13 minutes |
| 3.0 | | Assay | | | | |
| 3.1 | N-Acetyl-L-Cysteine | 90.0% to 110.0% of labelled amount | 99.6% | 99.2% | 100.4% | 99.5% |
| 3.2 | Lactoferrin | 90.0% to 110.0% of labelled amount | 101.2% | 100.9% | 98.3% | 98.9% |
| 3.3 | Beta Carotene | 90.0% to 110.0% of labelled amount | 97.6% | 98.3% | 101.4% | 98.8% |

Example 34: Animal Study

The effect of the compositions of the present invention was studied in animals. For this study, screening effect of synergistic combination of compositions/formulations comprising N-Acetyl-L-Cysteine, Lactoferrin and additional active ingredients for mucolytic activity in rat was performed. The following trials were carried out:

Eighty-Four (84) rats including male and female (Swiss Albino Rats) divided into 14 groups (6 per group) were maintained in animal house in a light/dark atmosphere based on a 12 hour cycle having temperature and relative humidity in the range of 19 to 25±2° C. and 30-70%, respectively. To maintain the appropriate conditions, temperature and relative humidity were recorded three times daily. All animals were acclimatized for a minimum period of five days. Animals were maintained in the test setup for minimum 30 minutes once during the acclimatization period to reduce the stress. Animals were weighed on the day of receipt and observed daily for abnormalities if any. Detailed records of acclimatization were also maintained. Rats were housed 3 per cage in clean, sterilized Polypropylene cages. During complete experiments, animals were supplied with the standard certified rat pellet feed and drinking water treated by reverse osmosis ad libitum.

In order to evaluate the mucolytic activity in rats, eighty-four (84) rats were screened and divided into Fourteen (14) groups. For a comparative analysis, groups were divided and treated as below:

TABLE 1

| Sr. No. | Group Name | No. of Animals (Rats) | Dose (g/kg, p.o.) |
|---|---|---|---|
| G1 | Normal Control | 6 | Normal Control |
| G2 | Diseased Control | 6 | Acetylcholine (0.03 g/kg, intratracheal) |
| G3 | Positive Control | 6 | Bromhexine (0.05 g/kg) |
| G4 | N-Acetyl-L-Cysteine (NAC) | 6 | NAC (3.72 g/kg) |
| G5 | Lactoferrin (LF) | 6 | LF (0.31 g/kg) |
| G6 | Carotenoid (Car.) | 6 | Car. (0.02 g/kg) |
| G7 | NAC:LF (10:1) - Ex 10 | 6 | NAC (3.72 g/kg) + LF (0.37 g/kg) |
| G8 | NAC:LF (11:1) - Ex 11 | 6 | NAC (3.72 g/kg) + LF (0.34 g/kg) |
| G9 | NAC:LF (12:1) - Ex 2 | 6 | NAC (3.72 g/kg) + LF (0.31 g/kg) |
| G10 | NAC:LF (13:1) - Ex 12 | 6 | NAC (3.72 g/kg) + LF (0.29 g/kg) |
| G11 | NAC:LF (14:1) - Ex 13 | 6 | NAC (3.72 g/kg) + LF (0.27 g/kg) |
| G12 | NAC:LF (15:1) - Ex14 | 6 | NAC (3.72 g/kg) + LF (0.25 g/kg) |
| G13 | NAC:LF (12:1) + Car. (0.31%) - Ex 6 | 6 | NAC (3.72 g/kg) + LF (0.31 g/kg) + Car. (0.02 g/kg) |

TABLE 1-continued

| Sr. No. | Group Name | No. of Animals (Rats) | Dose (g/kg, p.o.) |
|---|---|---|---|
| G14 | NAC:LF (12:1) + Car. (1.32%) - Ex 7 | 6 | NAC (3.72 g/kg) + LF (0.31 g/kg) + Car. (0.06 g/kg) |

Methodology:

Tracheobronchial secretion in rats, expressed by the amount of fluorescein sodium (FINa) dye excreted into the respiratory tract, was measured by modification of methods published earlier.

Lactoferrin, Carotenoid, N-Acetyl-L-Cysteine or their combinations (G4-G14) were suspended in 1% Acacia. Acetylcholine (G2) and Bromhexine (G3) were dissolved in distilled water. The said active ingredients were administered orally (1 ml/100 g body weight) 30 minutes before intravenous injection of FINa (300 mg/kg, 0.1 ml/100 g body weight) in fasted rats.

One hour after administration, all rats were sacrificed with $CO_2$ exposure; an incision was made, and the trachea was immediately exposed. An infant feeding tube was gently inserted into the trachea (about 30 mm deep). Five milliliters of 5% $NaHCO_3$ solution (~37° C.) was injected into the respiratory tract and immediately aspirated while gently massaging the thoracic area.

The tracheobronchial lavage fluid (4.9±0.1 ml) was centrifuged (3500 rpm for 10 minutes) and the supernatant was transferred to STP B & L tubes. The fluorescence intensity of the supernatant was measured with a Genesys 20 spectrophotometer set at a wavelength of 510 nm (emission).

Results:

Mucolytic effect: The results as shown in table 2, expressed as mean±SEM, showed that N-Acetyl-L-Cysteine, Lactoferrin, Carotenoid and their combinations exerted dose-dependent augmentation of tracheobronchial secretion of FINa. The percentage enhancement of FINa secretion compared to the normal group and the positive control group is presented in the tables 3 and 4 as well as FIGS. 1 and 2 respectively:

TABLE 2

Tracheobronchial Secretion of Fluorescein Sodium (FINa) by Lactoferrin, NAC, Carotenoid and their combination groups, Diseased Control (Acetylcholine 5 mg intratracheal) and Positive Control (Bromhexine 8 mg).

| Gr. No. | Group Name | Fluorescein Sodium (FINa) Secretion (µg/100 g/h) |
|---|---|---|
| G1 | Normal | 1.43 ± 0.21 |
| G2 | Diseased Control | 0.37 ± 0.12 |
| G3 | Positive Control | 2.64 ± 0.18 |
| G4 | NAC | 1.99 ± 0.08 |
| G5 | LF | 1.79 ± 0.04 |
| G6 | Carotenoid (Car.) | 1.64 ± 0.01 |
| G7 | NAC:LF (10:1) - Ex 10 | 3.02 ± 0.06 |
| G8 | NAC:LF (11:1) - Ex 11 | 3.30 ± 0.08 |
| G9 | NAC:LF (12:1) - Ex 2 | 3.47 ± 0.08 |
| G10 | NAC:LF (13:1) - Ex 12 | 3.36 ± 0.11 |
| G11 | NAC:LF (14:1) - Ex 13 | 3.33 ± 0.09 |
| G12 | NAC:LF (15:1) - Ex14 | 3.01 ± 0.04 |
| G13 | NAC:LF (12:1) + Car. (0.31%) - Ex 6 | 3.51 ± 0.06 |
| G14 | NAC:LF (12:1) + Car. (1.32%) - Ex 7 | 3.54 ± 0.06 |

TABLE 3

Percentage (%) Enhancement of FINa secretion compared to Normal by Lactoferrin, NAC, Carotenoid and their combination groups, Diseased control (Acetylcholine 5 mg intratracheal) and Positive Control (Bromhexine 8 mg).

| Gr. No. | Group Name | Percentage (%) Enhancement of FINa secretion compared to Normal |
|---|---|---|
| G2 | Diseased Control | -74.13 ± 6.4 |
| G3 | Positive Control | 84.62 ± 6.1 |
| G4 | NAC | 39.16 ± 5.1 |
| G5 | LF | 25.17 ± 1 |
| G6 | Carotenoid (Car.) | 14.69 ± 2.1 |
| G7 | NAC:LF (10:1) - Ex 10 | 111 ± 5.8 |
| G8 | NAC:LF (11:1) - Ex 11 | 131 ± 4.2 |
| G9 | NAC:LF (12:1) - Ex 2 | 143 ± 2.1 |
| G10 | NAC:LF (13:1) - Ex 12 | 135 ± 3.7 |
| G11 | NAC:LF (14:1) - Ex 13 | 133 ± 2.6 |
| G12 | NAC:LF (15:1) - Ex14 | 110 ± 1.4 |
| G13 | NAC:LF (12:1) + Car. (0.31%) - Ex 6 | 145 ± 1.7 |
| G14 | NAC:LF (12:1) + Car. (1.32%) - Ex 7 | 148 ± 1.4 |

TABLE 4

Percentage (%) Enhancement of FINa secretion compared to Positive Control (Bromhexine 8 mg) by Lactoferrin, NAC and Carotenoid combination groups:

| Gr. No. | Group Name | Percentage (%) Enhancement of FINa secretion compared to Positive control |
|---|---|---|
| G7 | NAC:LF (10:1) - Ex 10 | 14 ± 5.1 |
| G8 | NAC:LF (11:1) - Ex 11 | 25 ± 3.4 |
| G9 | NAC:LF (12:1) - Ex 2 | 31 ± 1.3 |
| G10 | NAC:LF (13:1) - Ex 12 | 27 ± 2.9 |
| G11 | NAC:LF (14:1) - Ex 13 | 26 ± 2.9 |
| G12 | NAC:LF (15:1) - Ex14 | 14 ± 1.1 |
| G13 | NAC:LF (12:1) + Car. (0.31%) - Ex 6 | 33 ± 1.7 |
| G14 | NAC:LF (12:1) + Car. (1.32%) - Ex 7 | 34 ± 1.1 |

Interpretation and Inference:

The results of the study revealed in Table 2 shows the mucolytic effects of treatment groups on tracheobronchial secretion of fluorescein sodium (FINa) in rats. The treatment groups G2-G14 were compared to normal group (G1) and the percentage enhancement of tracheobronchial secretion is provided in Table 3 and FIG. 1. Also, the treatment groups G7-G14 were compared to positive control (G3) and the percentage enhancement of tracheobronchial secretion is provided in Table 4 and FIG. 2.

Figure 1:
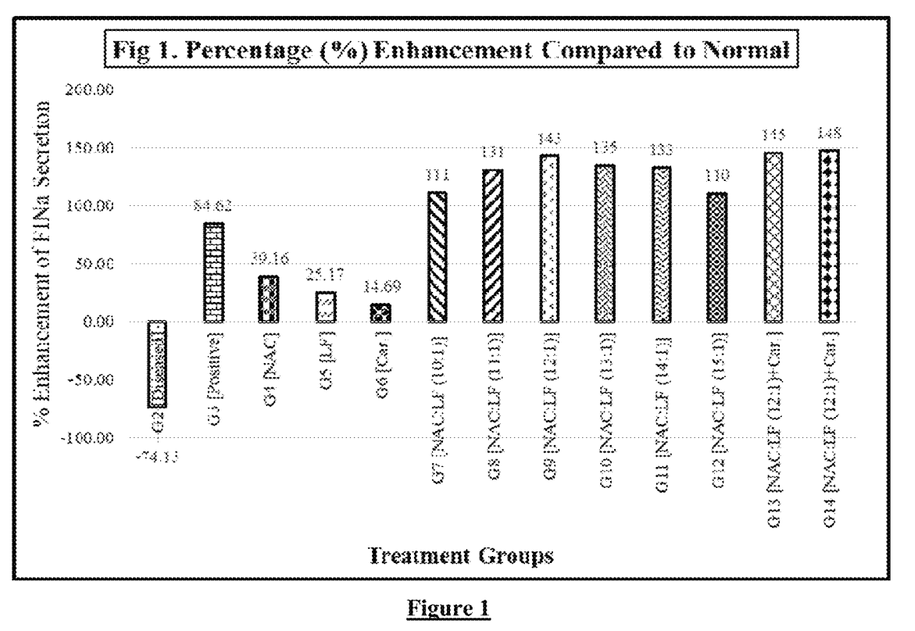
FIG. 1: Percentage (%) enhancement of Fluorescein Sodium (FINa) secretion in treatment groups [Lactoferrin, N-Acetyl-L-Cysteine (NAC), Carotenoid and their combination groups, Diseased Control (Acetylcholine 5 mg intratracheal) and Positive Control (Bromhexine)] as compared to Normal.

Percentage Enhancement of FINa Secretion Compared to Normal Group (G1) (Refer Table 3 and FIG. 1):

The normal group (G1) did not receive any treatment. The diseased group (G2) showed a significant decrease in tracheobronchial secretion (-74.13%) as compared to the normal group.

The positive control group (G3) demonstrated a significant increase in tracheobronchial secretion, with a percentage enhancement of 84.62% compared to the normal group.

N-Acetyl-L-Cysteine (G4), when administered alone, exhibited a percentage enhancement of 39.16% compared to the normal group. Lactoferrin (G5), when administered alone, did not showed any significant effect. The percentage enhancement was only 25.17% compared to the normal group (G1) indicating that Lactoferrin alone (G5) provides minimal mucolytic effect. For Carotenoid (G6) also, when administered alone, there was no significant enhancement and demonstrated a percentage enhancement of 14.69% only compared to the normal group (G1). The individual administration of NAC (G4), Lactoferrin (G5) and Carotenoid (G6) shows that only NAC (G4) can be considered to have some significant effect on providing mucolytic effect compared to Lactoferrin (G5) and Carotenoid (G6).

As compared to above, when NAC and Lactoferrin were administered in combination (G7-G12), showed significant enhancement ranging from 111% to 148%. This shows that while Lactoferrin alone (G5) does not have any significant role in providing mucolytic effect, it synergistically enhances the effect of NAC, i.e., the synergistic combination of Lactoferrin and NAC (G7-G12) provided mucolytic effect in COPD. It can be further observed that when the combination of Lactoferrin and NAC were administered in optimized synergistic ratio from 11:1 to 14:1 (G8-G11), there was significant synergistic effect as compared to G7 (10:1) and G12 (15:1).

It can be further observed that, when Carotenoid was added to the combination of Lactoferrin and NAC (G13 and G14), there was further enhancement showing that even Carotenoid further aided in the synergistic effect of the combination of Lactoferrin and NAC.

Figure 2:
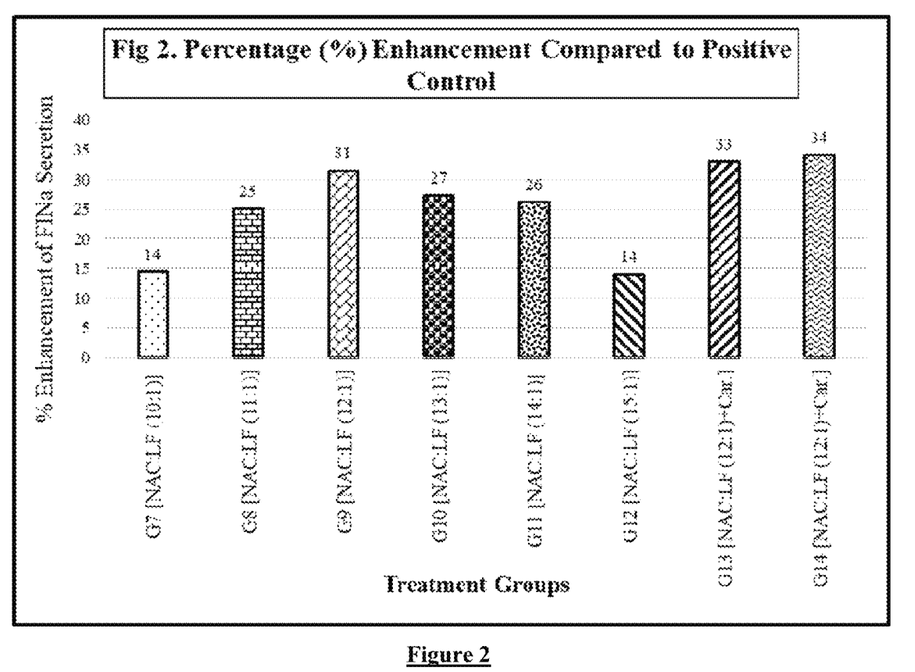
FIG. 2: Percentage (%) enhancement of Fluorescein Sodium (FINa) secretion in treatment groups (combination of Lactoferrin, NAC and Carotenoid) as compared to Positive Control.

Percentage Enhancement of FINa Secretion Compared to Positive Control (G3) (Refer Table 4 and FIG. 2):

Further, the effect obtained by the synergistic combinations of present invention (G8-G11, G13-G14) are better than positive control (G3).

The combination of Lactoferrin and NAC (G8-G11) when combined in judiciously selected ratio showed significant enhancement as compared to Positive control (G3). Similarly, the combination of Lactoferrin, NAC and Carotenoid (G13-G14) showed significant enhancement as compared to Positive control (G3).

Mortality: There was no mortality observed in all the treatment groups (G1-G14) during the study period.

CONCLUSION

Based on the experimental study conducted on rats, it can be concluded that the test compositions/formulations of the present invention, i.e., combination of NAC and Lactoferrin and combination of NAC, Lactoferrin with additional active ingredient(s) such as Carotenoid was found to be more effective in providing mucolytic effect and has a synergistic effect (G7-G14 especially G8-G11 and G13-G14) when compared with individual active ingredients (G4-G6). The results demonstrate that the said test combination of the present compositions/formulations can significantly enhance the secretion of fluorescein sodium (FINa) into the respiratory tract.

These findings have important implications for the development of mucolytic therapies for respiratory conditions. The ability of NAC, Lactoferrin, Carotenoid and their combinations to augment tracheobronchial secretion suggests their potential in improving mucus clearance and alleviating airway obstruction.

Furthermore, the present study highlights the importance of combination therapies, as the synergistic effects of NAC and Lactoferrin in optimized synergistic ratio from 11:1 to 14:1 showed superior mucolytic effect.

The invention claimed is:

1. A pharmaceutical composition comprising a combination of:
    a) N-acetyl-L-cysteine, and
    b) lactoferrin,
    wherein the ratio of N-acetyl-L-cysteine and lactoferrin is in a range of 11:1 to 14:1.

2. The pharmaceutical composition as claimed in claim 1, wherein the ratio of N-acetyl-L-cysteine and lactoferrin is 12:1.

3. The pharmaceutical composition as claimed in claim 1, wherein the pharmaceutical composition further comprises carotenoid as an active ingredient.

4. The pharmaceutical composition as claimed in claim 3, wherein the carotenoid is selected from cryptoxanthin, beta-carotene, lycopene or a combination thereof.

5. The pharmaceutical composition as claimed in claim 3, wherein the carotenoid is present in an amount from 0.15 to 2.24 wt % of the pharmaceutical composition.

6. The pharmaceutical composition as claimed in claim 1, further comprises a pharmaceutically acceptable excipient.

7. The pharmaceutical composition as claimed in claim 6, wherein the pharmaceutically acceptable excipient is selected from a binding agent, a diluent, a disintegrating agent, a glidant, a lubricant, a colourant, a coating agent, a solvent, an effervescent agent, a flavouring agent, a sweetener, or any combination thereof.

8. The pharmaceutical composition as claimed in claim 1, wherein the pharmaceutical composition is in a form of a powder, a tablet, an effervescent tablet, a capsule, a hard capsule filled with liquid or solid, a soft capsule, a pill, a sachet, a granule, a solution, a suspension, an emulsion or syrup.

9. The pharmaceutical composition as claimed in claim 1, wherein the pharmaceutical composition provides a mucolytic effect, reduces mucus hypersecretion, or reduces oxidative damage in a patient with chronic obstructive pulmonary disease (COPD).

* * * * *